(12) United States Patent
Smiljanic et al.

(10) Patent No.: US 10,379,824 B2
(45) Date of Patent: Aug. 13, 2019

(54) METHOD FOR STATIC SECURITY ENFORCEMENT OF A DSL

(71) Applicant: Oracle International Corporation, Redwood Shores, CA (US)

(72) Inventors: John Smiljanic, Austin, TX (US); Shailesh Vinayaka, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 15/055,136

(22) Filed: Feb. 26, 2016

(65) Prior Publication Data
US 2017/0249130 A1   Aug. 31, 2017

(51) Int. Cl.
| | |
|---|---|
| G06F 21/00 | (2013.01) |
| H04L 29/06 | (2006.01) |
| G06F 8/41 | (2018.01) |
| G06F 21/60 | (2013.01) |
| G06F 16/22 | (2019.01) |
| G06F 8/75 | (2018.01) |
| G06F 21/57 | (2013.01) |

(Continued)

(52) U.S. Cl.
CPC .............. G06F 8/41 (2013.01); G06F 8/427 (2013.01); G06F 8/43 (2013.01); G06F 8/75 (2013.01); G06F 16/22 (2019.01); G06F 21/577 (2013.01); G06F 21/604 (2013.01); G06F 2221/033 (2013.01)

(58) Field of Classification Search
CPC ...... G06F 8/41; G06F 8/427; G06F 17/30312; G06F 21/604
See application file for complete search history.

(56) References Cited

U.S. PATENT DOCUMENTS

| | | |
|---|---|---|
| 8,250,666 B2 | 8/2012 | Karabulut |
| 8,874,688 B1 | 10/2014 | Huntwork |
| 8,875,161 B2 | 10/2014 | Foti |

(Continued)

FOREIGN PATENT DOCUMENTS

EP      1870829 A1 * 12/2007 ............ G06F 21/52

OTHER PUBLICATIONS

Brett A. Becker, Kyle Goslin, Graham Glanville; "The Effects of Enhanced Compiler Error Messages on a Syntax Error Debugging Test"; Feb. 2018; SIGCSE '18: Proceedings of the 49th ACM Technical Symposium on Computer Science Education; Publisher : ACM; pp. 640-645 (Year: 2018).*

(Continued)

*Primary Examiner* — Kendall Dolly
*Assistant Examiner* — Courtney D Fields
(74) *Attorney, Agent, or Firm* — Trellis IP Law Group, PC

(57) ABSTRACT

An example system and method for securing computer code of a dynamic Domain Specific Language (DSL) that leverages a General Purpose Language (GPL). An example method includes enhancing compile-time security enforcement functionality for computer code written using the DSL, in part by using a compiler to perform static analysis on the DSL computer code. The static analysis includes referencing a security policy defining one or more unacceptable program behaviors; and indicating when execution of the computer code would result in performance of the one or more unacceptable program behaviors based on results of the static analysis.

19 Claims, 7 Drawing Sheets

(51) Int. Cl.
  *G06F 21/52*   (2013.01)
  *G06F 21/54*   (2013.01)

(56) References Cited

U.S. PATENT DOCUMENTS

| | | |
|---|---|---|
| 8,990,930 B2 | 3/2015 | Burrell |
| 9,027,075 B2 | 5/2015 | Driscoll |
| 2003/0018909 A1 | 1/2003 | Cuomo |
| 2009/0099882 A1 | 4/2009 | Karabulut |
| 2011/0154433 A1* | 6/2011 | Karabulut ............. G06F 21/604 726/1 |
| 2013/0086625 A1* | 4/2013 | Driscoll .................. G06F 21/52 726/1 |
| 2013/0283344 A1 | 10/2013 | Krstic |

OTHER PUBLICATIONS

Eclipse—http://help.eclipse.org/mars/index.jsp?topic=%2Forg.eclipse.pde.doc.user%2Fguide%2Ftools%2Feditors%2Fmanifest_editor%2Faccess_rules.htm; downloaded Feb. 24, 2016; 5 pages.
Compile-Time Enforcement of Dynamic Security Policies—http://ieeexplore.ieee.org/xpl/login.jsp?tp=&arnumber=4556590&url=http%3A%2F%2Fieeexplore.ieee.org%2Fxpls%2Fabs_all.jsp%3Farnumber%3D4556590; downloaded Feb. 24, 2016; 2 pages.

\* cited by examiner

METHOD FOR STATIC SECURITY ENFORCEMENT OF A DSL

CROSS REFERENCES TO RELATED APPLICATIONS

This application is related to U.S. Pat. No. 9,027,075, entitled ENFORCING SECURITY RULES AT RUNTIME, filed on Dec. 16, 2011, which is hereby incorporated by reference, as if set forth in full in this specification.

BACKGROUND

The present application relates to computing and more specifically to software and accompanying systems and methods for enhancing security and associated features of computer programming languages and associated computer programs.

Software security enforcement systems and methods are employed in various demanding applications, including mechanisms for authenticating users for database access; anti-malware technologies for sandboxing untrusted programs; mechanisms for preventing overwriting of critical operating system files; mechanisms for defining unsafe software actions in a given computing environment, and so on. Such applications often demand efficient mechanisms for facilitating specification, implementation, and enforcement of security policies and associated features, and which reduce or minimize the need for software developers to recode programs that may otherwise trigger inadvertent software runtime errors.

Efficient security enforcement mechanisms can be particularly important in enterprise applications that employ software written in Domain Specific Languages (DSLs), e.g., Groovy-based DSLs, where the DSL programs run in a General Purpose Language (GPL) computing environment used to run the DSL software programs. In such computing environments, dynamic DSLs are often employed to create special-purpose enterprise applications, modules, or functions that leverage Application Programming Interfaces (APIs) of the host GPL environment to implement the special-purpose functions defined by the DSL code.

The dynamic DSLs may support program runtime behaviors that a conventional static GPL program may allow during program compilation. Such dynamic behaviors may include, for example, modifying the dynamic DSL program during running of the program. However, dynamic DSL programs can present a security challenge when used to bypass security features of the host GPL computing environment using the APIs provided thereby. For example, in certain scenarios, an application developer could use a DSL program to access a private file system accessible to the DSL program via the GPL APIs.

In general, dynamic DSL programs embedded within a GPL environment with access to GPL APIs may be particularly susceptible to bugs or security breaches arising from unsupported use of the DSL and associated GPL APIs.

Conventionally, dynamic security enforcement, i.e., ensuring that a dynamic DSL program is secure and does not perform risky or otherwise undesirable operations (e.g., in violation of a security policy) is performed during execution of the DSL program, i.e., at runtime. However, from a developer perspective, fixing program error arising during execution of a DSL program can be problematic.

In particular, fixing a dynamic issue may require that an end user of a DSL program file a bug report describing the issue. The developer may then resolve the security issue and then redeploy the code to the running system. However, such runtime resolution of security issues can be problematic or prohibitively expensive. Furthermore, such issues may be visible to end users, resulting in disgruntled customers.

SUMMARY

An example method facilitates securing computer code of a dynamic Domain Specific Language (DSL), where the DSL leverages or runs on top of a General Purpose Language (GPL), by strategically enhancing compile-time security enforcement (also called static enforcement) functionality for computer code written using the DSL. The example method includes receiving the DSL computer code; using a compiler to perform static analysis on the computer code, wherein the static analysis includes referencing a security policy defining one or more unacceptable program behaviors; and then indicating when execution of the computer code would result in performance of the one or more unacceptable program behaviors based on results of the static analysis.

In a more specific embodiment, the DSL and GPL are supported by a development and runtime environment hosted in a cloud-based virtual machine (e.g., emulated computer system running on a server accessible via the Internet), such as a Java Virtual Machine (JVM). The runtime environment further hosts one or more software development tools (e.g., code editor, software development platform, or composer application or service), shared by plural tenants and configured to facilitate coding of the DSL computer code.

In the specific example embodiment, the one or more software development tools include a data composer software application that is written using the DSL (e.g., a Groovy-based DSL), Java, or other programming language. Compile-time metaprogramming functionality of a Groovy-based DSL may facilitate implementing the code editor (in addition to code edited thereby).

The security policy may be customizable by a developer of the DSL. Customizability of the security policy is facilitated via a secure Abstract Syntax Tree (AST) customizer, e.g., the Groovy AST customizer. The DSL may be a dynamic DSL that is dynamically typed. The unacceptable program behaviors may include one or more dynamic program behaviors, e.g., modification of preexisting computer code. The modification of preexisting computer code may include adjustment of the preexisting computer code to incorporate the computer code written using the DSL and associated composer software application.

The specific example method further includes employing a compile context of the compiler to facilitate access by the compiler to the security policy during semantic analysis performed by the compiler. The semantic analysis may include generating an AST and checking one or more nodes of the AST using the compile context to reference the security policy. The compile context facilitates compiler access to type information pertaining to the computer code, which is written using the dynamic DSL. The type information may include complex type information.

The static analysis and compile context may be used to, for example, allow an exit method to be invoked on an object identified via DSL computer code. Similarly, the static analysis and compile context may prevent invocation of certain GPL APIs, e.g., an exit on an object referenced in the DSL code. The security policy may include metadata characterizing one or more compiler extensions, type information associated with a computing object referenced by the computer code writing using the DSL, environment-specific context information, and so on.

The DSL computer code may include custom validation logic, e.g., which may be customized by an authorized end user or administrator. The security policy may also be customizable, but by a developer of the DSL used to host a development environment that in turn enables the end user modifications and development of programs, validation logic, or other computer code using the DSL.

The security policy may be implemented using a customizable programming language class, e.g., a Java class. Note that preexisting security policies used by a compiler may be augmented to perform security checks specified by the customizable programming language class.

The example method may further include or alternatively include accessing a predefined compile context for the DSL; using the compile context, on visit of an expression node of the syntax tree, to determine if the expression node is secure; and if access to a computing object associated with the expression node is not secure, then terminating compilation of the computer code and displaying a compiler error message. The compile context is accessible to the compiler to access metadata included in the security policy and applicable to the DSL. The compiler is configured to visit all expression nodes in a syntax tree associated with the computer code written using the DSL.

Hence, various embodiments may leverage enhanced compiler context and associated security policy information (e.g., type information) to support enhanced static security enforcement. The enhanced static security policy enforcement functionality enables developers to perform security checks (including checks for undesirable dynamic program behaviors) of computer code during compilation and before execution of the computer code.

The embodiments may be particularly suitable for selectively enforcing or restricting DSL program access to Application Programming Interfaces (APIs) of a GPL computing environment. Conventionally, DSL environments and associated DSL compilers often lack such security features or functionality that would enable compile-time security enforcement and restriction of unauthorized behaviors associated with use of GPL APIs.

Accordingly, use of improved static security enforcement as discussed herein provides developers with checks that can be performed when code is written and before deployment, where otherwise software-related errors occurring at runtime can be particularly problematic and costly to address. Accordingly, use of the enhanced compile context during compilation facilitates moving execute-time or runtime errors up to the compile-time developer environment, where they can more readily be fixed before official deployment.

A further understanding of the nature and the advantages of particular embodiments disclosed herein may be realized by reference of the remaining portions of the specification and the attached drawings.

DETAILED DESCRIPTION OF EMBODIMENTS

Figure 1:
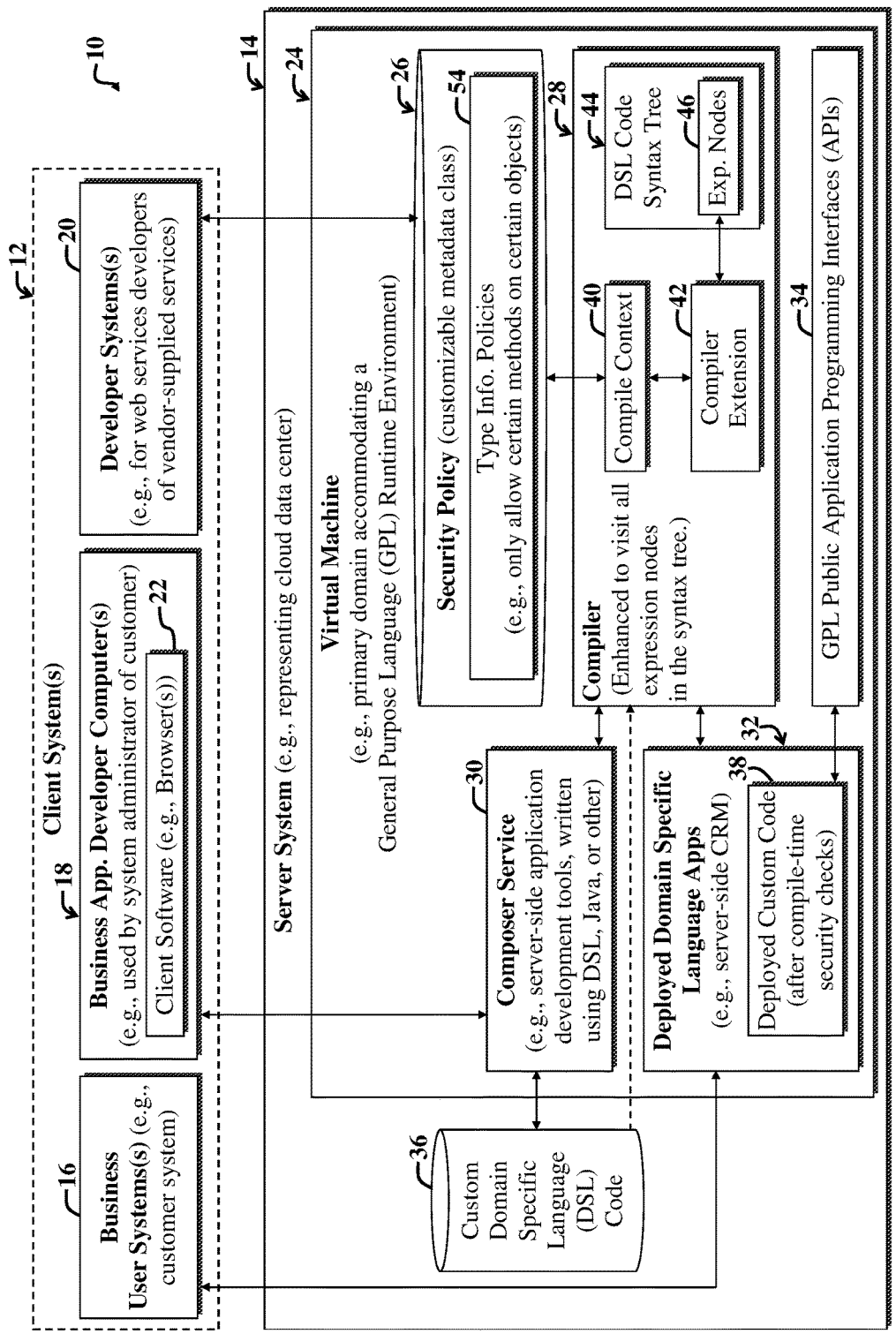
FIG. 1 illustrates a first example system and accompanying computing environment configured to enable compile-time security enforcement for computer code written in a Doman Specific Language (DSL) running in a General Purpose Language (GPL) computing environment.

Domain Specific Languages (DSLs) have enjoyed recent popularity with the creation of platforms (e.g., Groovy-based platforms) that allow framework designers to create simple languages for a specific set of tasks or business problems. For example, a DSL specialized to control the motion of a simple robot could be developed and used in place of a General Purpose Language (GPL), e.g., Java.

The DSL designer may define the language with domain-specific tokens, e.g., 'left', 'right', 'up', and 'down'. However, a potential security issue arises when the DSL (e.g., a Groovy-based DSL) is embedded within a GPL computing environment and has access to GPL Application Programming Interfaces (APIs).

Access to the GPL APIs may severely erode DSL designer intent by breaking encapsulation and allowing access to internal implementation detail. This can yield bugs due to unsupported use of the DSL. In more extreme cases, such access can also result in severe security risk. For example, security of a cloud-based application that provides a DSL to perform business validation may be severely impacted if the application developer application developer could use the DSL to access the private file system.

The above-identified and incorporated U.S. Pat. No. 9,027,075 describes a method for securing a DSL by selectively restricting runtime access to GPL APIs. Such method includes performing security checking dynamically, i.e., when the DSL's statements are executed.

Certain embodiments discussed herein set forth systems and methods for static security enforcement (also called compile-time checking or enforcement) of a DSL. Such embodiments provide development time feedback (to DSL code developers) on whether a program written in a DSL is secure. As set forth above, this facilitates reducing runtime errors and security breaches before code deployment.

Certain embodiments discussed herein may leverage compiler extensions, type information, and an environment specific compile context to implement, during compile-time, runtime-checking functionality described in the above-identified U.S. Pat. No. 9,027,075.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on intranet web servers, databases, files on local hard discs or file servers, email systems, document management systems, portals, and so on.

For the purposes of the present discussion, a web resource may be anything that can be named and addressed via a computer network, including computing language classes (e.g., Java classes), objects, web services, and so on. In general, anything that is referenced via a Uniform Resource Identifier (URI) or web address, such as a URL, can be considered a web resource. A URI may be may be any string of characters specifying a network address.

Enterprise software may be any set of computer code that is adapted to facilitate implementing any enterprise-related process or operation, such as managing enterprise resources, managing customer relations, and so on. The terms "enterprise software" and "enterprise application" may be employed interchangeably herein. However, an enterprise application may include one or more enterprise software modules or components, such as user interface (UI) software modules or components.

For the purposes of the present discussion, a computing system or computing environment may be may be any collection of computing resources used to perform one or more tasks involving computer processing. An example computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

For the purposes of the present discussion, a server may be any computing resource, such as a computer and/or software, which is adapted to provide content, e.g., data and/or functionality, to another computing resource or entity that requests it, i.e., the client. A client may be any computer or system that is adapted to receive content from another computer or system, called a server. An SOA server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, Internet Service Providers (ISPs), class loaders, assemblers, runtime engines or agents, enterprise databases (e.g., CRM database), websites, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment configured to enable compile-time security enforcement for computer code 36 written in a Doman Specific Language (DSL) running in a General Purpose Language (GPL) computing environment represented by a virtual machine 24.

The example system 10 includes various client systems 12 in communication with a server system 14 via a network, such as the Internet (not shown). The server system 14 may represent a cloud that is accommodated via a data center. Note that the term "cloud" as used herein may refer to a collection of data and/or functionality maintained on one or more servers accessible to one or more client devices via a network. Similarly, software and hardware running on one or more servers of the cloud are said to be cloud based. The terms "server side" and "cloud based" are employed interchangeably herein.

The server system 14 in includes a virtual machine (e.g., a Java Virtual Machine (JVM)) 24 that hosts a composer service 30; a compiler 28 in communication with the composer service 30 and a security policy 26; and various deployed Domain Specific Language (DSL) enterprise applications (e.g., CRM) 32.

For the purposes of the present discussion, a domain specific language may be any computer programming language that is specialized for a particular task or field, e.g., customizable enterprise applications. An example computer programming language that may be used to construct DSLs includes Groovy. Groovy represents an example of a dynamic programming language suitable for use with compile-time security checking methods discussed herein. The terms "compile-time security checking" and "static security analysis" (or simply "static analysis") may be employed interchangeably herein to refer to any processing of computer code, prior to deployment of the code, to determine errors or divergences from a security policy or programming language syntax.

The example client system 12 includes business user computer systems 16 (e.g., computers owned by subscribers of cloud services available via the server system 14), business application developer computers 18, and cloud-services developer computer systems 20. The various client systems 12 may access (e.g., via browsers) software functionality provided by the server system 14 via a network, such as the Internet.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The end-user business computer systems 16 may access various DSL applications 32 hosted by the server system 14. Examples of DSL applications include CRM software applications written using a DSL. Note that the client systems 12, which may access functionality provided by the server system 14, are not limited to merely browsing to and using cloud-based software applications 32, but may further include use of the composer service 30 and the business application developer systems 18 to develop custom DSL code that is then deployed as part of the deployed DSL application(s) 32.

In the present example embodiment, the business application developer system 18, which may be operated by a system administrator or other authorized personnel (e.g., as may be determined in accordance with log-in credentials), communicates with the composer service 30. The composer service 30 may represent a code editor or application development platform and/or service that provides functionality enabling system administrators to develop custom computer code. As set forth above, compiled and deployed versions of the customized computer code may be accessible to the deployed DSL applications 32. In the present specific embodiment, deployed custom code 38 is written using a DSL that is supported by the compiler 28.

The deployed custom code 38 may selectively access GPL Application Programming Interfaces (APIs) 34 (e.g., subject to compile-time security enforcement), which may represent public GPL code libraries. The GPL APIs 34 may access computer resources and functionality afforded by underlying GPL functionality upon which the DSL relies or is otherwise built upon. For example, a Groovy-based DSL may leverage an underlying Java GPL. For the purposes of the present discussion, a GPL computing environment may be any computing environment that supports development and/or compilation of computer programs or scripts written in the supported GPL.

For the purposes of the present discussion, a composer service may be any web service and/or software application or platform that provides functionality for system administrator or developers (or other users) to develop software applications, scripts, or other portions of computer code (e.g., validation code for validating actions implemented via the deployed DSL applications 32 and initiated via users of the business user systems 16). The composer service 30 may represent a collection of one or more software development tools and/or code editors usable by system administrators, e.g., administrators or developers using the business application developer computers 18.

The composer service 30 and the other deployed DSL applications 32 may represent web applications. For the purposes of the present discussion, a web application may be any computer code, e.g., a software application, which is adapted to be accessed by one or more client devices over a network, such as the Internet or an intranet. A web application may call and/or implement one or more web services.

Similarly, a web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

Note that functionality provided by the composer service 30 may be accessible to the business application developer computers 18 via client software 22, such as one or more browsers.

The example composer service 30 communicates with a custom DSL application code repository 36. The custom DSL application code repository 36 may store code, e.g., scripts, developed by users of the business application developer computers 18. The stored code may then be selectively forwarded to the server-side compiler 28 in preparation for compilation (including compile-time security checking and enforcement), deployment, and use by the deployed DSL applications 32.

Note that various modules of the system 10 may be grouped, arranged, coupled, and/or distributed differently than shown, without departing from the scope of the present teachings. For example, in an alternative grouping, the custom DSL application code repository 36 may be stored client side, e.g., on the business application developer computer system(s) 18. Similarly, in certain implementations, interconnections between modules may be different than those shown.

Furthermore, note that the virtual machine 24 may run one or more virtualized servers as part of one or more computing domains. In general, a server running on or represented by a virtual machine is said to be virtualized. For the purposes of the present discussion, a virtualized computing process or application may be a process or application that is associated with a layer of abstraction, called a virtual machine, that decouples, at least in part, physical hardware from the process or application.

A virtual machine may have so-called virtual hardware, such as virtual RAM, Network Interface Cards (NICs), and so on, upon which virtualized applications, such as operating systems and servers, are loaded. The virtualized computing processes may employ a consistent virtual hardware set that can be substantially independent of actual physical hardware.

In addition, note that developers using the business application developer computers 18 may be different than developers using the developer systems 20. In particular, developers or system administrators using the business application developer computers 18 may represent or correspond to tenants employed by end users wishing to configure or customize behaviors of the deployed DSL applications 32 to which the associated businesses subscribe to or otherwise use.

Users of the developer systems 20 may represent developers hired by software vendors and tasked with developing enterprise applications, such as the DSL applications 32 and the associated composer service 30. Such developers may employ the client developer systems 20 to not only develop DSL applications (e.g., the composer service 30 and DSL applications 32), but may adjust or otherwise customize a security policy for the underlying DSL and associated DSL code running on the server system 14 via the virtual machine 24, as discussed more fully below.

The example compiler 28 is enhanced to selectively sandbox dynamic DSL code 36 (e.g., developed via the business application developer computers 18), using compile-time checking (e.g., security enforcement) to prevent violations of the security policy 16, as discussed more fully below.

The enhanced compiler 28 (enhanced to facilitate compile-time checking of dynamic program behaviors associated with the custom DSL code 36) includes a compiler extension 42 in communication with security policy metadata (i.e., security policy information or specifications) 54 via a compile context module 40. The compiler extension 42 includes computer code to enhance the compiler 28 to analyze each expression node 46 of a DSL code syntax tree 44 constructed from custom DSL code 36 input to the compiler 28 in preparation for compilation and deployment as deployed custom code 38.

Note that the custom DSL code (e.g., which may represent scripts, e.g., scripts implementing validation logic) may be transferred to the compiler 28 via the composer service 30, or the composer service may otherwise trigger dispatch of the custom DSL code 36 to the compiler in response to selection of one or more UI controls accessible to the business application developer computers 18 via the composer service 30.

Custom DSL code 36 delivered to the enhanced DSL compiler 28 is parsed, and a corresponding Abstract Syntax Tree (AST) (also simply called syntax tree herein) is constructed. In the present example embodiment, all expression nodes 46 of the syntax tree 46 are analyzed using the compiler extension 42 with access to the security policy 26 (via the compile context), to determine whether the programming language expression represented by the AST node being analyzed complies with the security policy 26. The security policy 26 may be customized by one more authorized developers using the developer systems 20.

For the purposes of the present discussion, a syntax tree may be any tree representation of syntactic structure of computer code, e.g., source code representing the custom DSL code 36.

The security policy 26 may be implemented via a customizable metadata class. A metadata class may be a computer programming language object that includes information (metadata) describing the security policy and associated security rules.

The security policy metadata may include a description of type information. The type information may specify, for example, that when a computing object referenced by the custom DSL code 36 represents a particular type of computing object (e.g., refers to a row or column type of object, where the object includes row or column data from a database, e.g., a CRM database) a certain security rule applies to analyzing whether the reference and/or associated expression is allowed to performed given the type of object that the expression effects and how the expression affects the object.

Similarly, the term "type safety" may refer to the degree to which erroneous or unsafe (based on rules of a security policy) program behaviors are a function of data types used by or otherwise referenced in the program code. Additional examples of data types include constants, variables, methods (e.g., functions), and so on.

For the purposes of the present discussion, a security policy may be any collection of rules, conditions, and/or information specifying which types of computer program behaviors are allowed, e.g., which types of functionality are accessible to the computer program.

In the present example embodiment, the DSL used to implement the cloud-based applications 30, 32 and accompanying custom DSL code 36 represents a dynamic programming language.

For the purposes of the present discussion, a dynamic programming language may be any programming language that supports runtime execution of programming behaviors that static programming languages often perform at runtime, such as program modifications (e.g., resulting from the addition, removal, or modification of program code), changes to computing object structures, modification of an associated type system, and so on.

Similarly, dynamic program behavior may include any self-modification behaviors implemented during runtime. A dynamic variable may be any variable used in computer code, where a value attributed to the dynamic variable is determined a runtime, i.e., when the associated program is run. Similarly, a static variable is allocated or associated with a value or memory address determined at compilation time, i.e., when the associated program is being compiled.

Those skilled in the art will appreciate that the system 10 may include various additional modules to facilitate implementing and/or managing the security policy, without departing from the scope of the present teachings. For example, a Groovy public class called SecurityManager may facilitate implementing the security policy 26. The SecurityManager class may allow, for example, an application to determine (before performing a possibly unsafe or sensitive operation) what the operation is and whether it is being attempted in a security context that allows the operation to be performed. The application can allow or disallow the operation.

In general, for the purposes of the present discussion, a security manager may be any computing object that defines a security policy for an application, where the security policy specifies actions or program behaviors that are unsafe or sensitive.

The security policy 26 may employ a white list and/or black list identifying which program behaviors are allowed or not allowed, respectively. In general, in certain implementations, program behaviors may be allowed unless they are explicitly black listed.

Note that additional modules, such as a Groovy SecureASTCustomizer, may be employed to facilitate implementing embodiments discussed herein. Note that conventionally, a SecureASTCstomizer does not secure dynamic variables or facilitate enforcing security for dynamic variables (e.g. def a=System; a.exit(1);).

Embodiments discussed herein employ the compiler extension 42 in communication with the type information 54 and associated security policy 26 metadata to facilitate checking expression node 46 of the DSL code syntax tree 44 for dynamic variables.

Accordingly, the DSL code 36 transferred to the compiler 28 for compilation is effectively sandboxed by the security policy 26 and associated mechanisms 40, 42, in part via type checking and selective blocking of or preventing the running of computer code that violates the security policy 26. For the purposes of the present discussion, a mechanism for sandboxing a DSL may be any mechanism that monitors and/or enforces behaviors of computer code written in the DSL to selectively restrict the behaviors in accordance with a security policy.

Note that those skilled in the art with access to the present teachings, including the teachings of the above-identified (and the incorporated U.S. Pat. No. 9,027,075) may readily enhance the compiler 28 in accordance with the present teachings, without departing from the scope thereof. For example, those skilled in the art will appreciate that various embodiments may be implemented by using compiler extensions, type information, and an environment specific compile context, as discussed herein, to implement the method described in U.S. Pat. No. 9,027,075 at compile-time as opposed to at runtime only.

Figure 2:
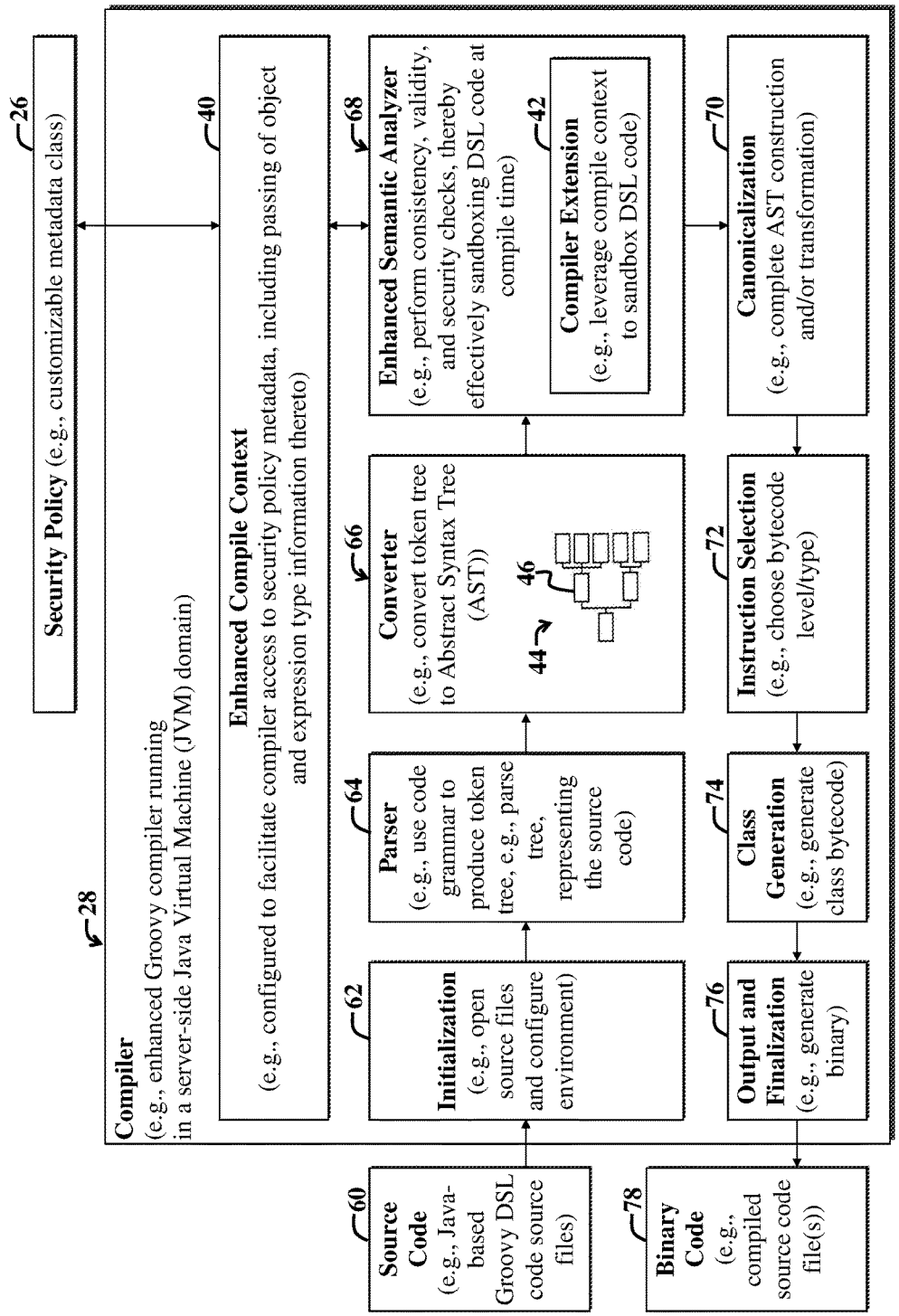
FIG. 2 illustrates additional detail of an example compiler suitable for use with the example system of FIG. 1.

FIG. 2 illustrates additional detail of an example compiler 28 suitable for use with the example system 10 of FIG. 1. The compiler 28 receives source code 60 as input. With reference to FIGS. 1 and 2, the source code 60 may represent custom DSL computer code extracted from or dispatched from the custom DSL code repository 36 of FIG. 1 and/or from or via the composer service 30.

The source code 60 may represent, for example, a script developed by a business administrator using the browser 22 of the business application developer computer 18 of FIG. 1 to access custom script functionality afforded by the server-side composer service 30. The script may perform a task, e.g., implementation of business validation logic, as discussed more fully below.

Note that the composer service 30 may be implemented in a DSL, e.g., a DSL specialized for implementing enterprise applications, scripts, or processing tasks in general using Groovy or other programming language that supports development and use of DSLs. Furthermore, the source code 60 may also be written in the DSL, i.e., using computer code that complies with a specification for the DSL as defined by Groovy code or other computer code.

The example compiler 28 represents an enhanced compiler, which is enhanced to enable compile-time security enforcement for DSL code, such as the source code 60. The enhancement is implemented in part via the compiler extension 42 of an enhanced semantic analyzer 68, the compiler extension of which may operate on nodes 46 of a syntax tree 44 determined by a converter module 66.

For the purposes of the present discussion, semantic analysis, also called context-sensitive analysis, may be any compiler process used to gather information from source code (e.g., as provided to the compiler 28 via the composer service 30 from the custom DSL code repository 36) pertaining to semantics or computer programming language terms and symbols of the computer code.

Type checking may be any process involving verifying and enforcing constraints or conditions based on type information associated with references or semantics occurring in the source code.

Note that in the present example embodiment, the enhanced compiler 28 is adapted to facilitate performing security checks that would conventionally be performed during a dynamic type checking process, i.e., type checking involving verifying safety (as defined by a security policy) of computer code during runtime, as discussed more fully below. Note that computer programming languages that employ dynamic type checking instead of static type checking are often considered to be dynamically typed programming languages.

The compiler 28 includes an initialization module 62, which receives the source code 60 as input. The initialization module 62 includes computer code for opening files of the source code 60 and configuring the compiler computing environment accordingly.

The opened source files are then parsed by a parser 64. Computer code grammar of the source files is processed or parsed to yield a token tree (also called a parse tree) representative of the source code 60.

The resulting parse tree is then input to the converter 66. The converter 66 includes computer code for converting the parse tree output by the parser 64 into the syntax tree 44. The syntax tree 44 includes various expression nodes 46, where each expression node represents a DSL expression occurring in the source code 60 and associated parse tree output by the parser 64.

Subsequently, the enhanced semantic analyzer 68 performs semantic analysis on the syntax tree 44. The sematic analysis may include performance of consistency checks, validity checks, security checks, and so on. Performance of the security checks as discussed herein effectively sandboxes the dynamic DSL source code 60, which is to be used to augment or modify the DSL application 32 of FIG. 1 with the deployed custom code 38.

Sandboxing of the DSL source code represented by the syntax tree 44 includes using the compiler extension 42 to access customizable metadata of the security policy 26 via a call or reference to the enhanced compile context module 40. Accordingly, the enhanced compile context module 40 is configured to facilitate access by the compiler 28 to the security policy 26 and associated type information and security policy rules.

If the DSL passes the various checks performed by the enhanced semantic analyzer 68, the resulting code is forwarded to a canonicalization module 70. Otherwise, the compiler extension 42 may abort compilation and generate an error message viewable by a system administrator using the business application developer computer 18 and associated browser 22 of FIG. 1.

The canonicalization module 70 completes any remaining syntax tree construction and/or compiler transformations applicable to compilation of the source code 60. The resulting updated syntax tree and associated code is then forwarded to an instruction selection module 72.

The instruction selection module 72 is configured to select a type of byte code, e.g., byte code level (e.g., Java level 6, level 7, or other level), in preparation for generating byte code and associated classes via a subsequent class generation module 74.

Resulting bytecodes are forwarded to an output and finalization module 76. The output and finalization module

76 is configured to convert or compile bytecodes output by the class generation module 74 into binary and to write the resulting binary to one or more output files, e.g., executable files.

Figure 3:
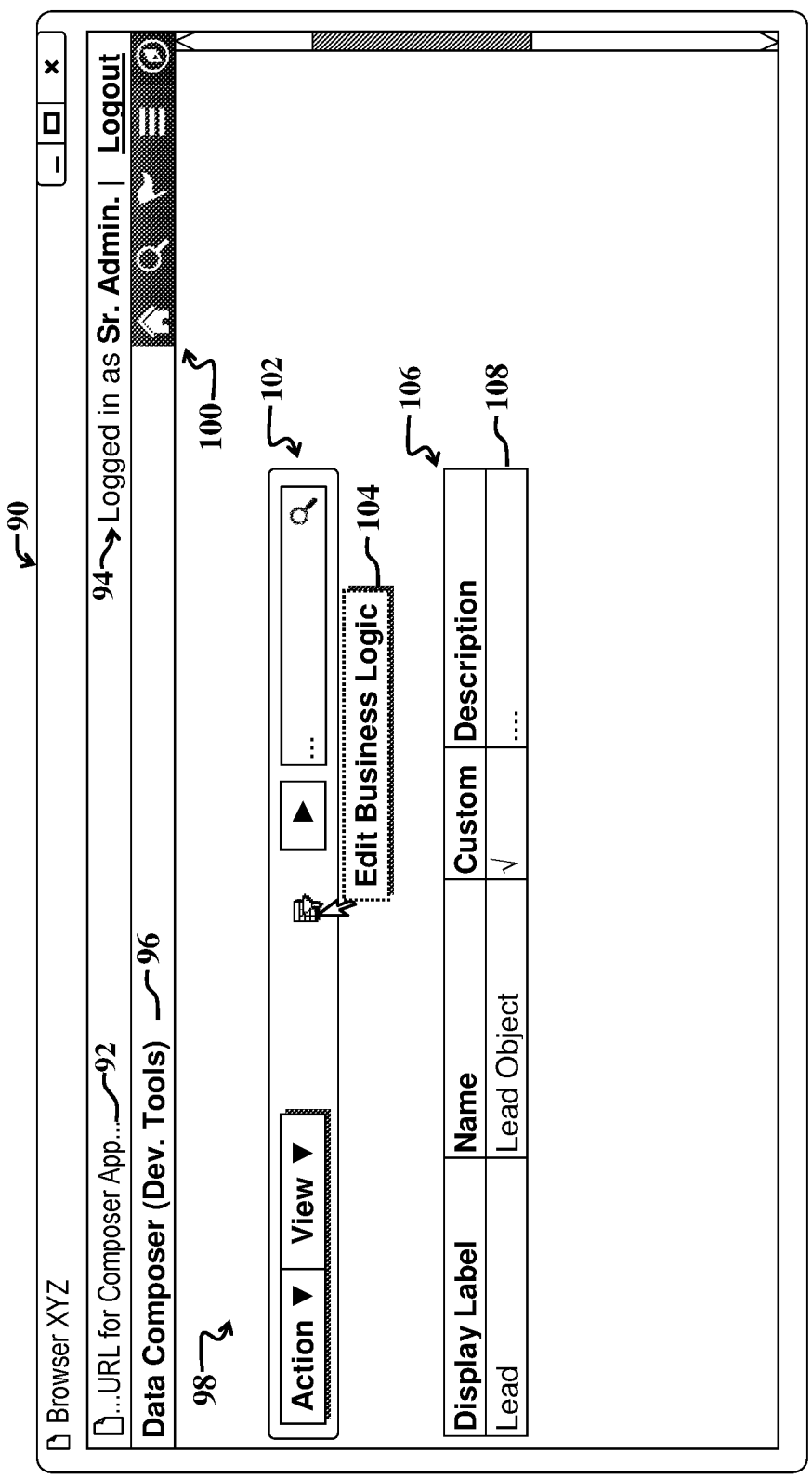
FIG. 3 illustrates a first example User Interface (UI) display screen of a code editor that includes UI controls for enabling a business administrator to enter custom code using DSL programming language constructs that may be sandboxed in the GPL environment via the system of FIG. 1.

FIG. 3 illustrates a first example User Interface (UI) display screen 90 of a code editor (e.g., corresponding to the composer service 30 of FIG. 1) that includes various UI controls 102-108 for enabling a business administrator (or other user of the client software 22 of FIG. 1) to enter custom code using DSL programming language constructs that may be sandboxed in the GPL environment (e.g., as represented by the virtual machine 24 of FIG. 1).

With reference to FIGS. 1 and 3, the first example UI display screen 90 may represent a UI display screen presented in the browser 22 of FIG. 1 and generated, at least in part, using the composer service 30. A Uniform Resource Locator (URL) or Uniform Resource Identifier (URI) 92 is entered into the browser UI display screen 90 to access a so-called data composer window (identified by a data composer label 96).

For the purposes of the present discussion, a data composer may be any set of one or more software development tools (e.g., software applications, services, or functionality) specialized to facilitate generation of computer code (e.g., applications, scripts, etc.) for accessing, manipulating, or otherwise using data objects, e.g., which may correspond to rows, columns, dimensions, or other groupings of data in a database (e.g., CRM database).

The first example UI display screen 90 includes various UI navigation tools 100 for facilitating accessing different UI controls and associated features and UI display screens available via the underlying composer service and/or software application.

The first UI display screen 90 illustrates an example business objects section 98, which includes a listing 106 of accessible business objects. In the present example embodiment, the listing 106 identifies only one data object, called a lead object, which is represented by a first row 108 in the listing 106. The lead object associated with the first row 108 represents a custom data object, as indicated by a checkmark in a custom column of the object listing 106.

A set of example UI controls in a toolbar 102 for manipulating the listing and/or otherwise accessing objects for further manipulation is provided. In the present example embodiment, a user has selected a button in the toolbar 102, resulting in display of an edit business logic UI control 104.

User selection of the edit business logic UI control 104 triggers subsequent display of another UI display screen, whereby a user, e.g., system administrator, may further edit the lead object identified and selected in the first row 108 of the object listing 106.

Figure 4:
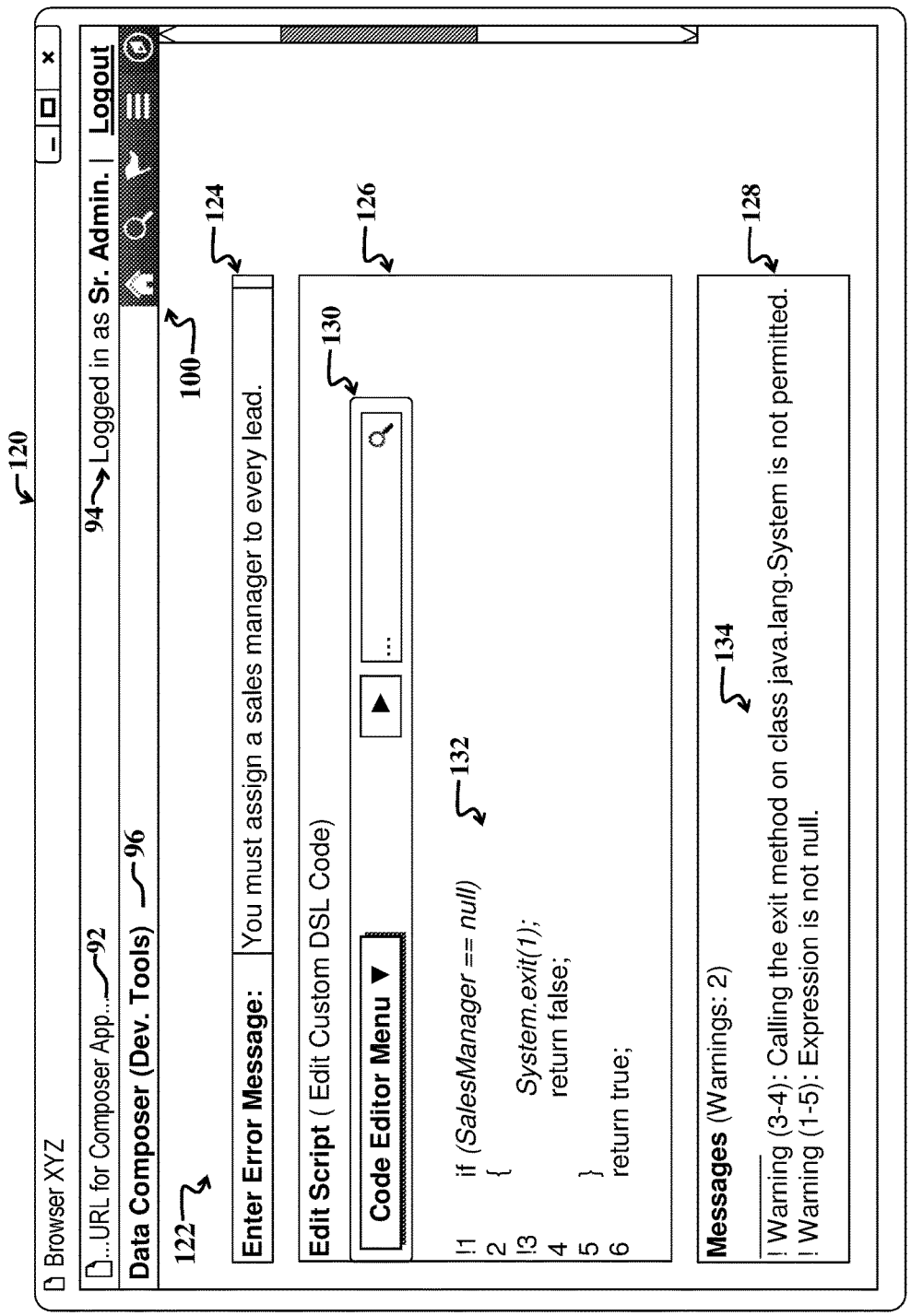
FIG. 4 illustrates a second example UI display screen implementable via the code editor used to implement the first UI display screen of FIG. 3, and further illustrating example business validation logic entered by a business administrator with access to the associated code editor.

FIG. 4 illustrates a second example UI display screen 120 implementable via the code editor (also called composer service 30) used to implement the first UI display screen 90 of FIG. 3, and further illustrating example business validation logic 132 entered by a business administrator with access to the associated code editor.

The second example UI display screen 120 may be displayed in response to user selection of the edit business logic button 104 of FIG. 3. The second example UI display screen 120 includes an example code-editing section 122, which includes an error message specification section 124, a code section 126, and a warning section 128.

The error message specification section 124 includes a field whereby a user, e.g., system administrator, may enter an error message to display if an associated script 132 evaluates to true when the script is run or tested. In the present example embodiment, the user has entered an error message, which reads "You must assign a sales manager to every lead."

The code section 126 includes a toolbar 130 with UI controls for facilitating typing and/or otherwise entering custom DSL code 132, which represents a custom dynamic script comprising validation logic. In particular, the code 132 (which may correspond to the source code 60 of FIG. 2 and which may be stored in the custom code repository 36 of FIG. 1) checks whether or not a sales manager object is null, and if so, triggers a system exit and returns false; otherwise the code 132 evaluates to true.

However, in accordance with the security policy (e.g., the security policy 26 of FIGS. 1 and 2) a system exit is not permitted in the validation logic 132. Accordingly, error messages 134 are displayed in the warning section 128. The warning messages 134 are displayed before the code 132 is run. Accordingly, a user may adjust the code 132 to account for the detection of the dynamic issue (i.e., issue arising from violation of dynamic DSL security policy 26).

Note that, in addition, before the code 132 is compiled and deployed as the deployed custom code 38 of FIG. 1, a test compilation may be run using the composer service 30 of FIG. 1, as discussed more fully below with reference to FIG. 5.

Figure 5:
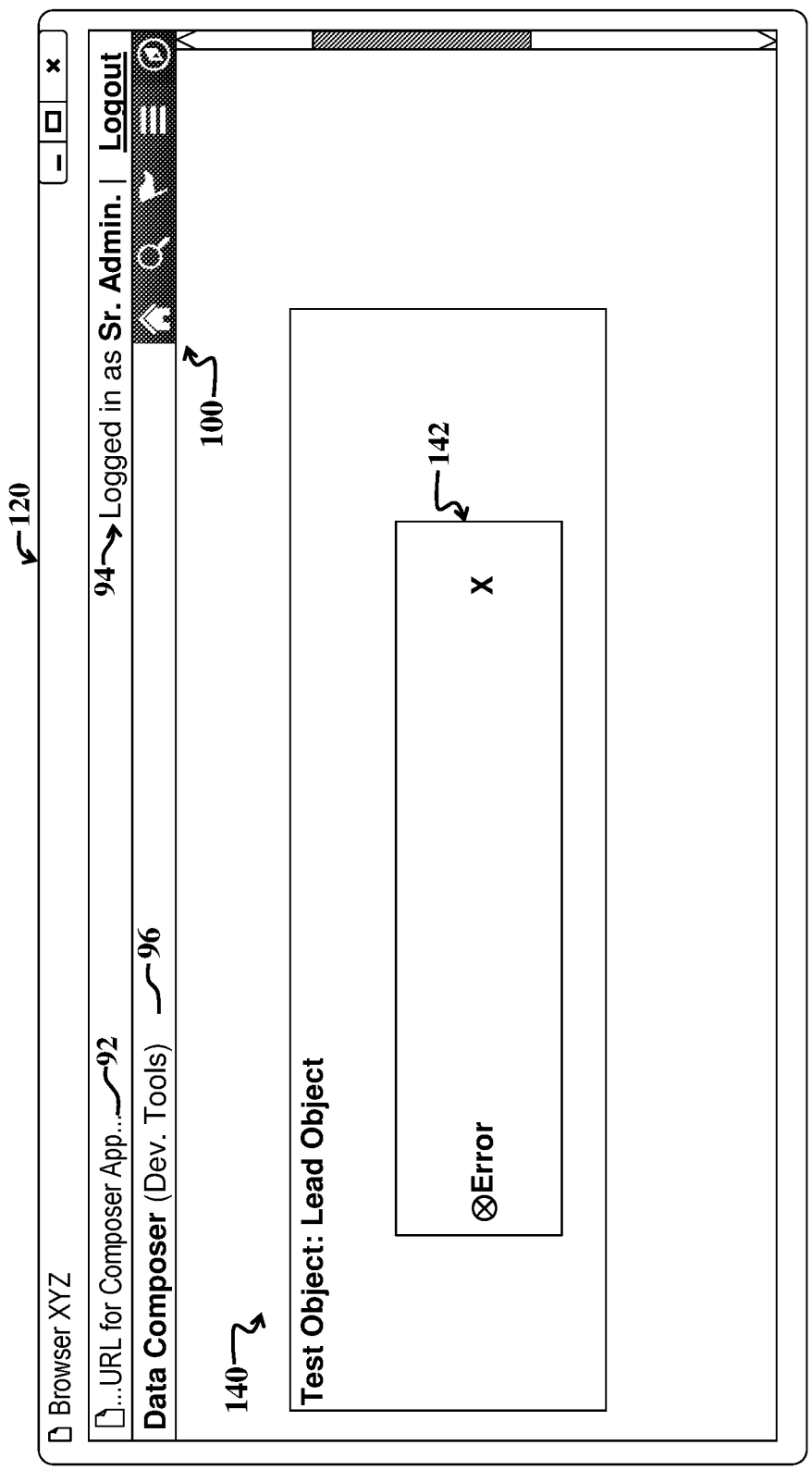
FIG. 5 illustrates a third example UI display screen appearing during a compile-time test of the business validation logic entered via the second UI display screen of FIG. 4.

FIG. 5 illustrates a third example UI display screen 120 appearing during a compile-time or pre-deployment test of the business validation logic entered via the second UI display screen 120 of FIG. 4.

The third example UI display screen includes an object testing section 140, which illustrates an error pop-up window 142. The error pop-up window 142 displays the error message specified in the error message section 124 of FIG. 4. This is consistent with the fact that the user has not yet assigned a sales manager to the lead object.

Figure 6:
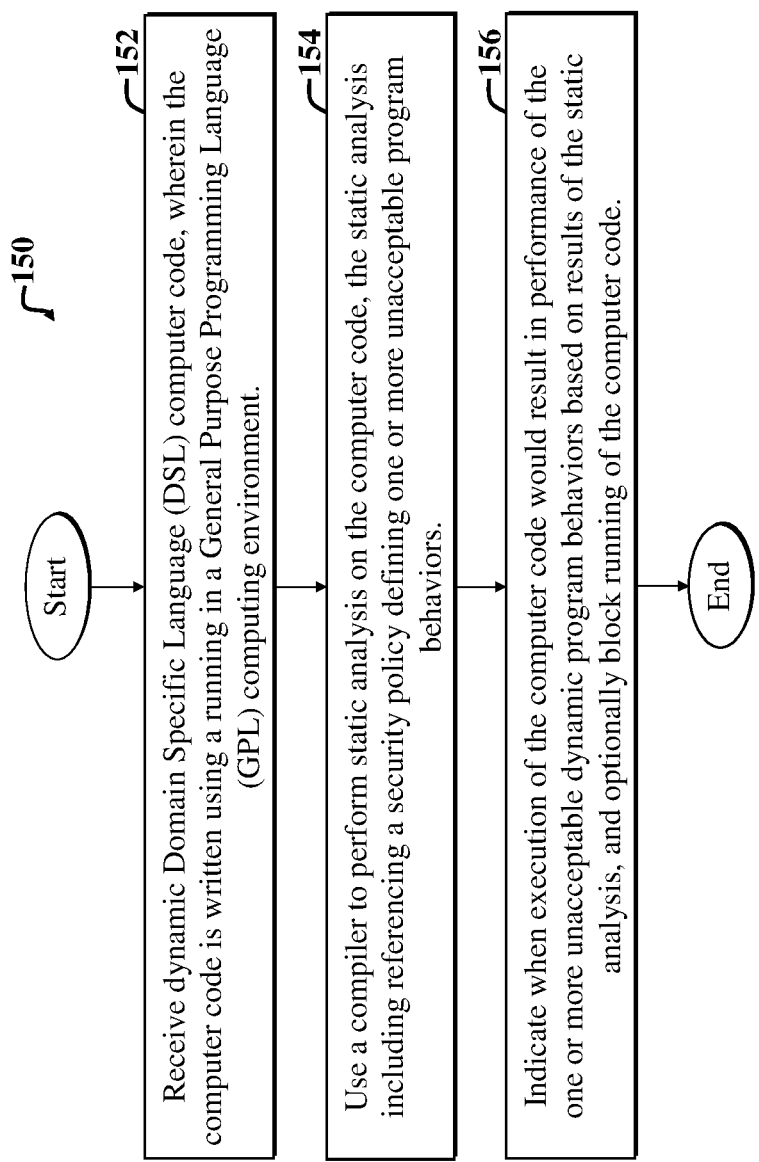
FIG. 6 is a flow diagram of a first example method suitable for use with the embodiments of FIGS. 1-5.

FIG. 6 is a flow diagram of a first example method 150 suitable for use with the embodiments of FIGS. 1-5. The first example method 150 facilitates securing computer code, e.g., DSL code written to be dynamically patched into an existing deployed software application or service, e.g., the CRM application or service 32 of FIG. 1.

The first example method 150 includes an initial code-receiving step 152, which involves receiving the DSL computer code that is to run in a GPL computing environment. The code is entered or written using an existing DSL program, e.g., representing the composer service 30 of FIG. 1.

Subsequently, a static analysis step 154 includes using a compiler to perform static analysis on the computer code. The static analysis including referencing a security policy that defines one or more unacceptable program behaviors. Note that term "program behavior" as used herein may refer to any action or computing process performed in accordance with computer code, e.g., may include script behavior.

Next, an indication step 156 involves indicating when execution of the computer code would result in performance of the one or more unacceptable program behaviors based on results of the static analysis. Example indications are shown in FIG. 4 (e.g., the warning messages 134) and the test error window 142 of FIG. 5. The indication may further include blocking of deployment or running of the checked code in the deployed DSL application or service 32 of FIG. 1.

Note that the method 150 may be modified, without departing from the scope of the present teachings. For example, additional steps may be added to the method 150, or the method may be replaced or interchanged with other methods.

For example, method 150 may be replaced with a method for generating a secure DSL using a language (e.g., Groovy) for facilitating developing DSLs; may be replaced with a method for enhancing security features of a dynamic DSL for facilitating compile-time security enforcement of DSL code that is otherwise conventionally done at execute time; may be replaced with another method for performing static security checks of a program written in a DSL and leveraging APIs of a GPL environment in which the DSL program runs; may be replaced with a method for configuring a new type of DSL compiler for sandboxing custom DSL code, and so on.

The example method 150 may be applicable to a GPL computing environment implemented, at least in part, via a cloud-based, i.e., server-side, virtual machine that provides or includes a runtime environment for the compiler.

The runtime environment may further host one or more software development tools (e.g., composer service 30 of FIG. 1) that are shared by plural tenants (e.g., corresponding to different clients accessing the software development tools) and configured to facilitate coding of the computer code written using the dynamic DSL.

In a more specific embodiment, the GPL runtime environment supported by the virtual machine runs a composer software application (e.g., implementing a multi-tenant service), where the composer service itself is written in DSL computer code and further supports development of custom DSL scripts.

Those skilled in the art will appreciate that various types of computer DSLs, including DSLs or other languages (e.g., Groovy) used to create DSLs may leverage metaprogramming functionality to implement the composer service 30 of FIG. 1 or other code editor functionality.

For the purposes of the present discussion, metaprogramming functionality may be any functionality enabling a first program to treat a second program as data, such that the first program can read, generate, analyze, or transform the second program (called the object program) or itself (i.e., the first program). Note that Groovy provides such metaprogramming functionality and may be used to implement the composer service 30 (i.e., code editor, also called development tools) of FIG. 1.

The security policy used in the method 150 of FIG. 1 may be customizable by a developer of the DSL (e.g., a developer using the developer system 20 of FIG. 1). The customizability of the security policy may be facilitated by a Groovy secure AST customizer.

The one or more unacceptable program behaviors may include, for example, one or more dynamic program behaviors supported by a dynamically typed dynamic DSL. The one or more dynamic program behaviors may include modification of preexisting computer code, such as adjustment of the preexisting computer code (e.g., code of the deployed DSL applications 32 of FIG. 1) to incorporate the computer code (e.g., the code 38 of FIG. 1) written using the DSL includes one or more validation rules, e.g., the validation logic represented by the code 132 of FIG. 4.

The example method 150 may further include employing a compile context of the compiler to facilitate access by the compiler to the security policy during semantic analysis performed by the compiler. The semantic analysis may include generating an AST and checking one or more nodes of the AST, such as all expression nodes of the AST.

The example method 150 may be further augmented to include performing a security check associated with one or more dynamic program behaviors using static compile-time checking and compile context. The compile context facilitates compiler access to type information pertaining to the computer code written using the dynamic DSL. The type information may include complex type information.

For the purposes of the present discussion, complex type information may be any type information may include details about a particular object being referenced in the DSL code. For example, if an exit method is called on an object of type "row," the security policy may specify that such a call is allowed, whereas an exit method or other method to be invoked on another object of a particular type may not be allowed. Accordingly, embodiments are not limited to enforcement of static calls but may also be used to check dynamic calls.

Accordingly, the example method 150 may further include employing the static analysis and compile context to selectively allow an exit method to be invoked on an object identified via the computer code written using the DSL. Similarly, the static analysis and compile context may prevent invocation of certain GPL APIs, e.g., an exit on an object referenced in the DSL code.

Security policy metadata may be passed to the compiler via the compiler context (also called compile context herein). The security policy metadata may include information characterizing one or more compiler extensions, type information associated with a computing object referenced by the computer code writing using the DSL, and environment-specific context information. Environment-specific context information may be any information that is specific to a particular computing environment in which the associated virtual machine (i.e., virtual machine that hosts the compiler) runs.

The computer code written using the DSL includes custom validation logic. The security policy may include or otherwise be implemented via a customizable programming language class, e.g., a customizable Java class that is modifiable by a platform developer (e.g., a developer using the system 20 of FIG. 1).

The example method 150 may further include selectively adapting a preexisting security policy of the compiler to facilitate performing one or more security checks specified by the customizable programming language class, the customizable programming class implemented via the DSL.

The computer code written using a DSL is received via a server-side, i.e., cloud-based code editor, for editing code written in the DSL. The computer code written using the DSL ma run in the GPL computing environment (e.g., Java execution environment).

The DSL is effectively sandboxed using compile context to facilitate ensuring that the computer code adheres to one or more security rules restricting runtime behavior of the computer code before the computer code is run.

The computer code written using the DSL may run within a JVM, wherein the JVM also runs a software development platform (e.g., the composer service 30 of FIG. 1) written in the DSL, wherein the platform is adapted to enable the user to enter the computer code.

Accordingly, a security policy is initially defined that allows certain predetermined methods to be called on certain predetermined objects. The security policy may be implemented via a customizable Java class that enables specification of which methods are allowed to be called on certain objects and which are not. The security policy is then adapted to a compiler using compile context thereof to facilitate compile-time enforcement of dynamic program behaviors in accordance with the security policy.

Figure 7:
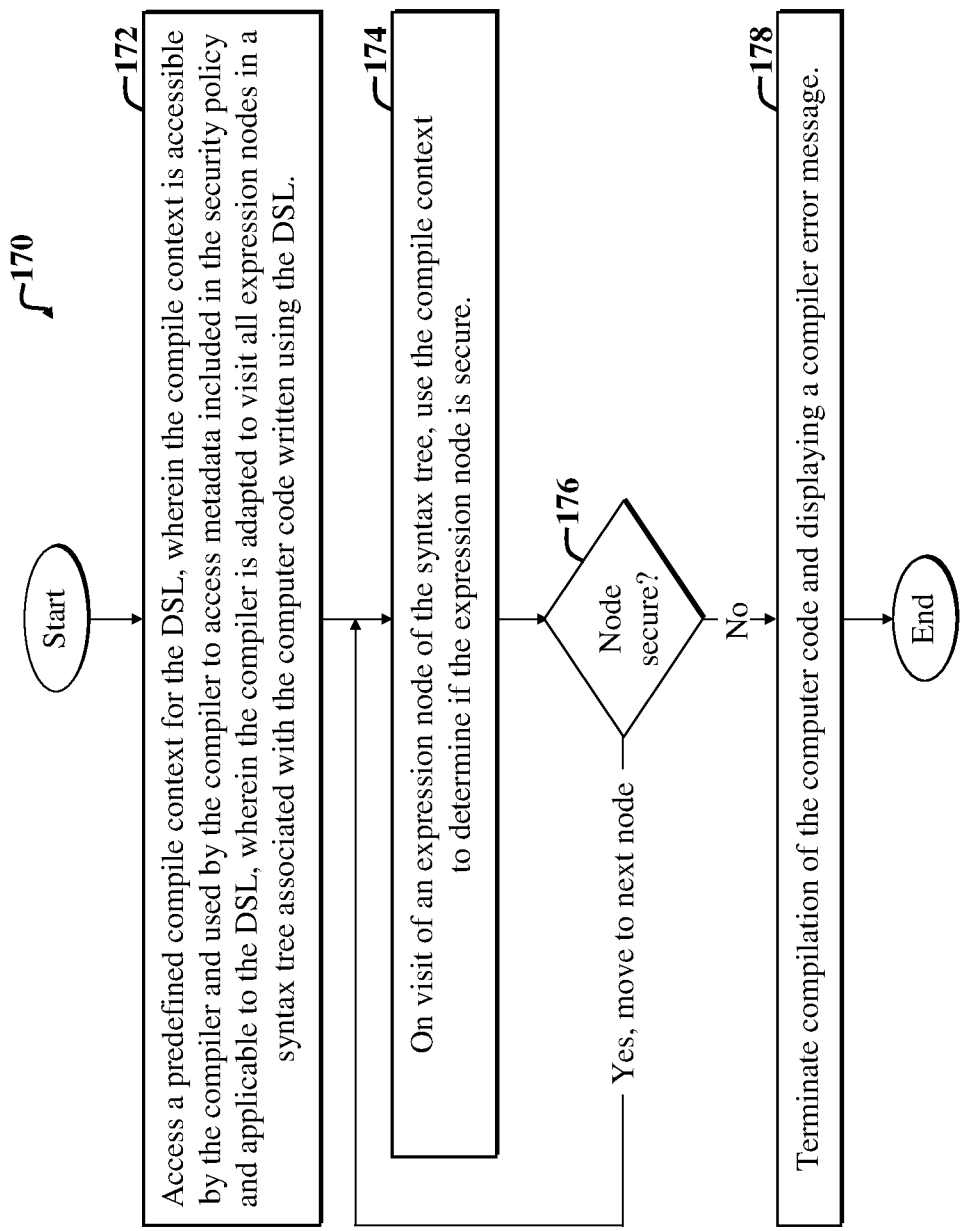
FIG. 7 is a flow diagram of a second example method suitable for use with the embodiments of FIGS. 1-6.

FIG. 7 is a flow diagram of a second example method 170 suitable for use with the embodiments of FIGS. 1-6. The second example method 170 includes a first step 172, which involves accessing a predefined compile context for the DSL.

The compile context is accessible by the compiler and used by the compiler to access metadata included in the security policy and applicable to the DSL. The compiler is adapted to visit all expression nodes in a syntax tree associated with the computer code written using the DSL.

The second example method 170 further includes a second step 174, which involves, on visit of an expression node of the syntax tree, using the context (and associated security policy metadata and rules) to determine if the expression node is secure.

Next, a third step 176 includes checking if the node is secure, and if not, then performing a fourth step 178. The fourth step 178 includes terminating compilation of the computer code and displaying a compiler error message, warning, or other notification or indication. The notification or indication may be displayed in a UI of a browser, wherein the content of the UI includes content generated by a composer service.

If the third step 176 determines that the node is secure (e.g., based on results of the second step 174), then the second step 174 may be revisited, and the next node in the syntax tree checked with reference to the security policy via the compile context. After all nodes of the syntax tree are checked, and if no security policy violations are found, then the DSL code may be deemed validated, and the method 170 may complete (if the method has not already completed due to detection of an error or security policy violation).

Although the description has been described with respect to particular embodiments thereof, these particular embodiments are merely illustrative, and not restrictive. For example, while various embodiments are discussed herein with reference to mechanisms and methods for sandboxing or selectively restricting access to GPL functionality afforded to DSL code via one or more APIs using customizable compile context, embodiments are not limited thereto. For example, any dynamic programming language that relies upon runtime security enforcement of dynamic program behaviors may benefit my implementing compile-time security that would otherwise conventionally be performed only during runtime, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for securing computer code, the method comprising:

receiving the computer code, wherein the computer code is written using a dynamic Domain Specific Language (DSL) running in a General Purpose Language (GPL) computing environment;

using a compiler to perform static analysis on the computer code, the static analysis including referencing a security policy defining one or more unacceptable program behaviors;

performing, during compile time at the compiler, runtime security checking functionality leveraging compiler extensions, type information, and environment specific compile context;

indicating when execution of the computer code would result in performance of the one or more unacceptable program behaviors based on results of the static analysis, wherein the one or more unacceptable program behaviors include modifying preexisting computer code to incorporate the computer code written using the DSL;

accessing a predefined compile context for the DSL, wherein the compile context accessible by the compiler and used by the compiler to access metadata included in the security policy and applicable to the DSL, wherein the compiler is adapted to visit all expression nodes in a syntax tree associated with the computer code written using the DSL;

using the compile context, on visit of an expression node of the syntax tree, to determine if the expression node is secure; and if access to a computing object associated with the expression node is not secure, then:

terminating compilation of the computer code written using the DSL and displaying a compiler error message.

2. The method of claim 1, wherein the computing environment includes a virtual machine, and wherein the virtual machine includes a cloud-based virtual machine that hosts a runtime environment that includes the compiler and supports computer code implemented via the GPL and the DSL.

3. The method of claim 2, wherein the runtime environment further hosts one or more software development tools shared by plural tenants and configured to facilitate coding of the computer code written using the dynamic DSL.

4. The method of claim 3, wherein the one or more software development tools includes a data composer software application, wherein the computer code written using the DSL includes the data composer software application.

5. The method of claim 4, further including employing Groovy compile-time metaprogramming functionality to implement a code editor.

6. The method of claim 2, wherein the security policy is customizable by a developer of the DSL, and wherein customizability of the security policy is facilitated via a Groovy secure Abstract Syntax Tree (AST) customizer.

7. The method of claim 2, wherein the one or more unacceptable program behaviors include one or more dynamic program behaviors, and wherein the DSL is a dynamic programming language that is dynamically typed.

8. The method of claim 7, wherein the one or more dynamic program behaviors includes the modifying of the preexisting computer code, and wherein the modifying of the preexisting computer code includes adjustment of the preexisting computer code to incorporate the computer code written using the DSL, and wherein the computer code written using the DSL includes one or more validation rules.

9. The method of claim 2, wherein using further includes employing a compile context of the compiler to facilitate access by the compiler to the security policy during semantic analysis performed by the compiler.

10. The method of claim 9, wherein the semantic analysis further includes generating an (AST) and checking one or more nodes of the Abstract Syntax Tree (AST), and wherein the one or more nodes of the AST include all expression nodes of the AST.

11. The method of claim 1, wherein using further includes performing a security check associated with one or more dynamic program behaviors using static compile-time checking and compile context, wherein the compile context facilitates compiler access to type information pertaining to the computer code written using the dynamic DSL, wherein the type information includes complex type information.

12. The method of claim 11, further including employing the static analysis and compile context to prevent an exit method from being invoked on an object identified via the computer code written using the DSL, and further including passing security policy metadata to the compiler via the compiler context.

13. The method of claim 12, wherein the security policy metadata includes information characterizing one or more compiler extensions, type information associated with a computing object referenced by the computer code written using the DSL, and environment-specific context information.

14. The method of claim 1, wherein the security policy includes a customizable programming language class.

15. The method of claim 14, wherein the customizable programming language class includes a customizable Java class, and further including adapting a preexisting security policy of the compiler to facilitate performing one or more security checks specified by the customizable programming language class, the customizable programming class implemented via the DSL.

16. The method of claim 1, wherein the computer code written using a DSL is received via a cloud-based code editor for editing code written in the DSL; wherein the computer code written using the DSL is running in the GPL computing environment; and wherein the DSL is sandboxed using compile context to facilitate ensuring that the computer code written using the DSL adheres to one or more security rules restricting runtime behavior of the computer code written using the DSL before the computer code is run.

17. The method of claim 16, wherein the computer code written using the DSL runs within a JVM that also runs a software development platform written in the DSL and adapted to enable a user to enter the computer code written using the DSL.

18. An apparatus comprising:
a processor-readable storage device including one or more instructions;
a digital processor coupled to a display and to the processor-readable storage device, wherein the digital processor executes the one or more instructions to perform the following acts:
receiving computer code, wherein the computer code is written using a dynamic Domain Specific Language (DSL) running in a General Purpose Programming Language (GPL) computing environment;
using a compiler to perform static analysis on the computer code, the static analysis including referencing a security policy defining one or more unacceptable program behaviors;
performing, during compile time at the compiler, runtime security checking functionality leveraging compiler extensions, type information, and environment specific compile context;
indicating when execution of the computer code would result in performance of the one or more unacceptable program behaviors based on results of the static analysis, wherein the one or more unacceptable program behaviors include modifying preexisting computer code to incorporate the computer code written using the DSL;
accessing a predefined compile context for the DSL, wherein the compile context accessible by the compiler and used by the compiler to access metadata included in the security policy and applicable to the DSL, wherein the compiler is adapted to visit all expression nodes in a syntax tree associated with the computer code written using the DSL;

using the compile context, on visit of an expression node of the syntax tree, to determine if the expression node is secure; and if access to a computing object associated with the expression node is not secure, then:

terminating compilation of the computer code written using the DSL and displaying a compiler error message.

19. A processor-readable storage device including instructions when executed by a digital processor, the processor-readable storage device including one or more instructions for:

receiving computer code, wherein the computer code is written using a dynamic Domain Specific Language (DSL) running in a General Purpose Programming Language (GPL) computing environment;

using a compiler to perform static analysis on the computer code, the static analysis including referencing a security policy defining one or more unacceptable program behaviors;

performing, during compile time at the compiler, runtime security checking functionality leveraging compiler extensions, type information, and environment specific compile context;

indicating when execution of the computer code would result in performance of the one or more unacceptable program behaviors based on results of the static analysis, wherein the one or more unacceptable program behaviors include modifying preexisting computer code to incorporate the computer code written using the DSL;

accessing a predefined compile context for the DSL, wherein the compile context accessible by the compiler and used by the compiler to access metadata included in the security policy and applicable to the DSL, wherein the compiler is adapted to visit all expression nodes in a syntax tree associated with the computer code written using the DSL;

using the compile context, on visit of an expression node of the syntax tree, to determine if the expression node is secure; and if access to a computing object associated with the expression node is not secure, then:

terminating compilation of the computer code written using the DSL and displaying a compiler error message.

\* \* \* \* \*